United States Patent
St. Mary et al.

(10) Patent No.: US 10,527,013 B2
(45) Date of Patent: Jan. 7, 2020

(54) HYDROGENATED LIQUID FUEL PRODUCTION AND INDUCTION SYSTEM FOR GASOLINE AND DIESEL INTERNAL COMBUSTION ENGINES

(71) Applicant: SALUS ENERGY SOLUTIONS, L.P., Long Beach, CA (US)

(72) Inventors: Harvey K. St. Mary, Downey, CA (US); James A. Chadick, La Mirada, CA (US); Ross Cornell, Long Beach, CA (US)

(73) Assignee: SALUS ENERGY SOLUTIONS, L.P., Long Beach, CA (US)

( * ) Notice: Subject to any disclaimer, the term of this patent is extended or adjusted under 35 U.S.C. 154(b) by 0 days.

(21) Appl. No.: 16/069,705

(22) PCT Filed: May 25, 2017

(86) PCT No.: PCT/US2017/034560
§ 371 (c)(1),
(2) Date: Jul. 12, 2018

(87) PCT Pub. No.: WO2017/205681
PCT Pub. Date: Nov. 30, 2017

(65) Prior Publication Data
US 2019/0085802 A1 Mar. 21, 2019

Related U.S. Application Data

(60) Provisional application No. 62/341,228, filed on May 25, 2016.

(51) Int. Cl.
*F02M 37/00* (2006.01)
*F02M 25/12* (2006.01)
*F02M 25/10* (2006.01)

(52) U.S. Cl.
CPC ........ *F02M 37/0064* (2013.01); *F02M 25/10* (2013.01); *F02M 25/12* (2013.01); *Y02T 10/121* (2013.01)

(58) Field of Classification Search
CPC ........ F02M 25/00; F02M 25/10; F02M 25/12; F02M 37/0064; B01F 13/06; B01F 3/04; Y02T 10/121
See application file for complete search history.

(56) References Cited

U.S. PATENT DOCUMENTS

| | | | |
|---|---|---|---|
| 4,596,210 A | 6/1986 | Schmidtke | |
| 7,011,048 B2 * | 3/2006 | Gurin | B01F 3/04468 123/1 A |

(Continued)

FOREIGN PATENT DOCUMENTS

WO WO 2011/124872 10/2011

*Primary Examiner* — Grant Moubry
(74) *Attorney, Agent, or Firm* — Kenneth L. Green; Averill & Green

(57) ABSTRACT

A hyperbaric fuel system (10a, 10b) produces hydrogenated liquid fuel (30) for combustion reactions of compression or spark ignition engines and improves fossil fuel efficiency without requiring major changes to existing fuel systems. The hydrogenated liquid fuel (30) decreases the NOx, CO and unburned hydrocarbon particulate matter, and reduces the consumption of liquid fuel (26). The systems produces hydrogen gas (18) and dissolves the hydrogen gas (18) in the liquid fuel (26) using several chambers, including a hyperbaric mixing chamber (58), between the liquid fuel supply and a fuel pump (28) supplying the hydrogenated liquid fuel (30) to fuel injectors (40). Unused hydrogen gas (18) and hydrogenated liquid fuel (30) is recirculated to minimize loss of efficiency. The system preferably includes a water reservoir and electrolysis device to generate the hydrogen gas.

17 Claims, 2 Drawing Sheets

(56) References Cited

U.S. PATENT DOCUMENTS 8,641,020 B2 * 2/2014 Gurin .................... F02M 29/00
261/79.1
8,726,852 B2 5/2014 Gurin et al.
2008/0245318 A1 10/2008 Kuroki et al.
2014/0000571 A1 1/2014 Gurin et al.

* cited by examiner

HYDROGENATED LIQUID FUEL PRODUCTION AND INDUCTION SYSTEM FOR GASOLINE AND DIESEL INTERNAL COMBUSTION ENGINES

CROSS-REFERENCE TO RELATED APPLICATIONS

The present application claims the priority of U.S. Provisional Patent Application Ser. No. 62/341,228 filed May 25, 2017, and PCT Application Serial No. PCT/US17/34560, which applications are incorporated in their entirety herein by reference.

TECHNICAL FIELD

The present invention relates to internal combustion engine fuel and in particular to a hyperbaric fuel system that improves fossil fuel efficiency without requiring major changes to existing fuel systems.

BACKGROUND ART

Known systems have attempted to deliver hydrogen gas to a combustion chamber through the air intake or by some other method of air induction. The properties of hydrogen are such that known air induction systems lose substantial quantities of hydrogen gas, that the proper introduction of measured quantities of hydrogen is difficult to achieve, and no system has heretofore been presented that consistently delivers optimal amounts of hydrogen to the combustion chamber, nor in a manner conducive to on-the-road application. Air induction methods have not proven to be practical or efficient. Thus, no hydrogen fuel injection system for internal combustion engines has yet been significant in the marketplace.

DISCLOSURE OF THE INVENTION

The present invention addresses the above and other needs by providing a hyperbaric fuel system which produces hydrogenated liquid fuel for combustion reactions of compression or spark ignition engines and improves fossil fuel efficiency without requiring major changes to existing fuel systems. The hydrogenated liquid fuel decreases the NOx, CO and unburned hydrocarbon particulate matter, and reduces the consumption of fossil fuel. The systems produces hydrogen gas and dissolves the hydrogen gas in the liquid fuel using several chambers, including a hyperbaric chamber, between the liquid fuel supply and a fuel pump supplying the hydrogenated liquid fuel to fuel injectors. Unused hydrogen gas and hydrogenated liquid fuel is recirculated to minimize loss of efficiency. The system preferably includes a water reservoir and electrolysis device to generate the hydrogen gas.

In accordance with one aspect of the invention, there is provided a hyperbaric mixing chamber. Hydrogen is produced, compressed and delivered at predetermined pressures into the hyperbaric mixing chamber, which causes the hydrogen gas to compress and suspend in the fossil fuel. The hydrogen gas is not injected into the moving fuel stream but, rather, is dissolved/suspended and thereby attaches to the carbon molecules within the liquid fuel base in the hyperbaric chamber before being directed forward in the system. The already-existing fuel system present on a given application may be adjusted/tuned to compensate for the extra energy being brought to the combustion chamber via hydrogenated fossil fuel, which will contribute further to reduced fuel consumption and overall emissions improvements.

In accordance with another aspect of the invention, there is provided a system for introducing hydrogen gas directly into the liquid fuel base and supplying and circulating hydrogenated liquid fuel to and from the fuel injectors of an internal combustion engine. The system dissolves hydrogen gas in liquid gasoline or liquid diesel fuel under pressure, much like carbon dioxide is dissolved in liquid to make carbonated beverages. Under pressure, hydrogen gas dissolves, differentiates and attaches to carbon molecules in the liquid fuel base, forming C—H bonds at the molecular level. Hydrogen dissolved/suspended in liquid fossil fuel tends to remain dissolved until agitated in a location where there is an atmosphere or some other means of escape. The presence of dissolved hydrogen in liquid fuel in the internal combustion engine's fuel injection system is safe and improves engine efficiency.

In accordance with yet another aspect of the invention, there is provided a bi-fuel (hydrogenated fossil fuel) generation system. Producing bi-fuel in the hyperbaric chamber is much more efficient with regard to the use of hydrogen gas than attempting to introduce hydrogen by injection through the air intake or under pressure into a moving or non-static fuel stream. There are no losses due to laminar airflow or cavitations in the liquid fuel base resulting from conditions or fuel pump operations. The energy contained in hyperbaric-created bi-fuel remains when the pressure in the hyperbaric mixing chamber is relaxed because where there are no outside dynamic forces to jar the product the internal pressure remains present with its compressed hydrogen content. This may be called static supercharging with added energy.

In accordance with still another aspect of the invention, there is provided a hydrogen induction generation and delivery system. Hydrogen is produced onboard through electrolysis of water. The water is conductive, i.e. it contains baking soda, or some other conductor. The hydrogen induction generation and delivery system does not require any fuel additives other than water.

BRIEF DESCRIPTION OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

BEST MODE FOR CARRYING OUT THE INVENTION

Figure 1:
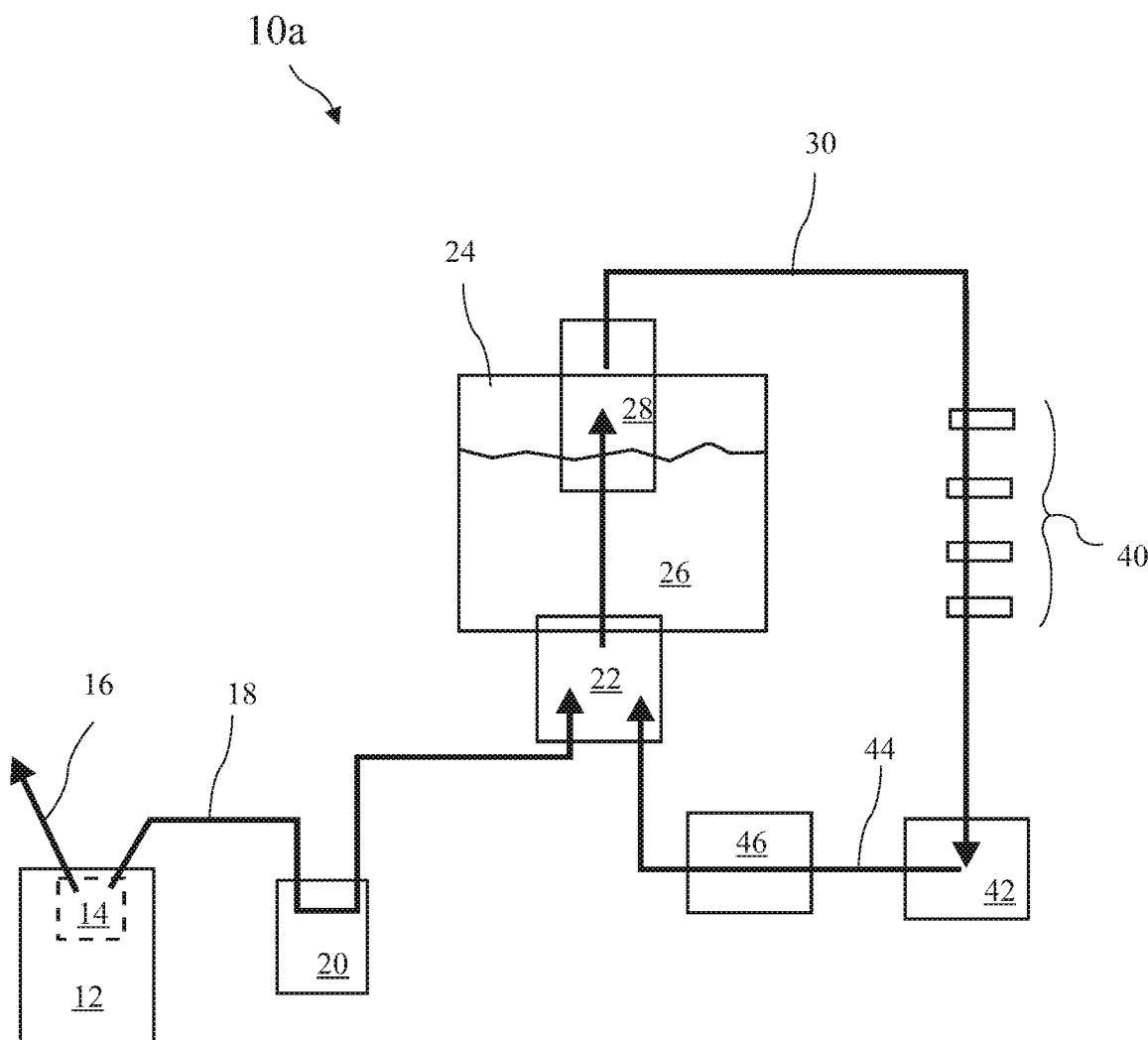
FIG. 1 shows a hydrogen induction system exercising fuel pump compression according to the present invention.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

A first hydrogen induction system 10*a* exercising fuel pump compression is shown in FIG. 1. A hydrogen generator 12 produces hydrogen gas 18 and oxygen 16 from electrolysis of water and separates the hydrogen gas 18 from unwanted particulate and debris in a hydrogen separator 14. The hydrogen gas 18 generated by the hydrogen generator 12 passes through a cooler 20, input port 22 and fuel tank 24 (containing liquid fuel 26) and into high pressure fuel pump 28. The high pressure fuel pump 28 dissolves the hydrogen 18 in the liquid fuel 26 to produce hydrogenated fuel 30. The hydrogen molecules are compressed in the high pressure fuel pump 28 and are carried along in the hydrogenated fuel 30 and pumped to the injectors 40 by the high pressure fuel pump 28. Unused fuel 44 passes through a pressure regulator 42, a cooler 46, and into the fuel tank 26 through input port 22.

The hydrogen gas 18 and liquid fuel 26 are drawn into fuel pump 28, utilizing the pressure within fuel pump 28 to dissolve hydrogen gas 18 into the liquid fuel 26, producing the hydrogenated fuel 30, with hydrogen saturation in the hydrogenated fuel 30 being dependent on the pressure level of fuel pump 28.

Figure 2:
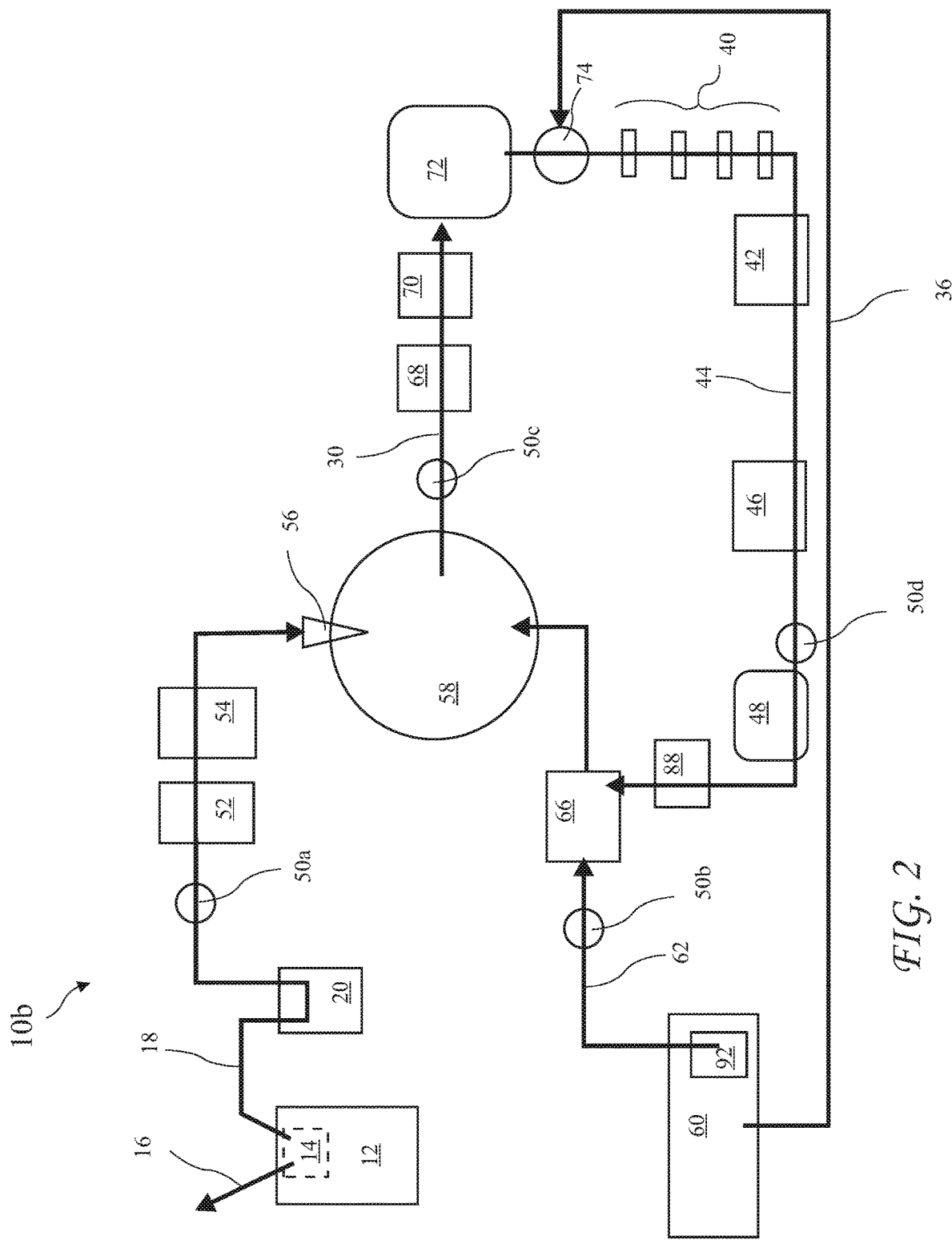
FIG. 2 shows a hydrogen induction system exercising hyperbaric mixing chamber compression according to the present invention.

A second hydrogen induction system 10*b* exercising hyperbaric mixing chamber compression is shown in FIG. 2. The hydrogen generator 12 produces the hydrogen gas 18 and oxygen 16 from electrolysis of water and separates the hydrogen gas 18 from the oxygen 16 in a hydrogen separator 14. The hydrogen gas 18 passes through a cooler 20, a check valve 50*a*, a compressor 52, a proximity vent/control 54 and through a jet 56 into a hyperbaric mixing chamber 58.

A liquid fuel tank 60 provides liquid fuel 62 through fuel pump 92, check valve 50*b*, and a proximity control 66, and into the hyperbaric mixing chamber 58 where the hydrogenated liquid fuel 30 is produced by dissolving the hydrogen gas 18 in the liquid fuel 62 under pressure produced by compressor 52 and jet 56. The pressure differential produced by the higher pressure compressor 52, the jet 56, and the lower pressure check valve 50*c*, pushes hydrogenated liquid fuel 30 through check valve 50*c* to pressure regulator 68 and proximity control 70 and into hydrogenated fuel bladder 72. From fuel bladder 72 the hydrogenated liquid fuel 30 is picked up by fuel injection pump 74 and sent to the fuel injectors 40.

For internal combustion engines that include a fuel return system, the returning hydrogenated liquid fuel 30 is returned from the injectors, through a pressure regulator 42 and a cooler 46 through check valve 50*d* to fuel bladder 48, where it can be picked up and reintroduced to the hyperbaric mixing chamber 58 by fuel pump 88 through proximity control 66.

The proximity control 66 includes a proximity switch and close/open control, and determines when the hyperbaric mixing chamber 58 is full of liquid fuel and then shuts off the flow of liquid fuel 62 into the hyperbaric mixing chamber 58. The proximity control 66 also determines when the amount of liquid fuel in hyperbaric mixing chamber 58 is low, and opens to permit the flow of additional liquid fuel 62 and returning fuel 44 into the hyperbaric mixing chamber 58. The three-fold purpose of the proximity control 66 is to keep sufficient liquid fuel 62 and returning fuel 44 in the hyperbaric mixing chamber 58 to dissolve hydrogen gas 18 in the liquid fuel, to prevent backflow from the hyperbaric mixing chamber 58 under high pressure conditions, and to recirculate hydrogenated liquid fuel 30 from the hydrogenated fuel bladder 48 back into the hyperbaric mixing chamber 58. The hydrogen gas 18 is dissolved in the liquid fuel 62 by compression of the hydrogen gas 18 into the liquid fuel 62 in the hyperbaric mixing chamber 58.

The hydrogen separator 14 provides a bath process where the hydrogen gas 18 is circulated through water to remove unwanted particulate and debris resulting from electrolysis. Because of the capacitive energy present when extracting hydrogen from water, the electrolysis creates pressure which brings water particulates forward. The hydrogen separator 14 removes the water particulates out of the hydrogen gas 18 formed in electrolysis. As the hydrogen gas 18 is generated, there is a voltage pressure that rises with the hydrogen escaping at velocity, pushing particulate in front of the hydrogen gas 18.

The hydrogenated fuel 30 is pumped by the fuel pump 74 through the fuel lines to the fuel injectors 40 for introduction into the combustion chamber. The hydrogenated fuel 44 returned from the injectors 40 is fed through the pressure regulator 42 and through the cooler 46 to remove unwanted heat, then directed back through check valve 50*d* into fuel bladder 48.

Proximity control 54 includes a proximity switch and close/open control for hydrogen. When the proximity control 54 determines that hyperbaric mixing chamber 58 is full of liquid fuel, proximity control 54 introduces hydrogen gas into hyperbaric mixing chamber 58 through the jet 56.

Hyperbaric mixing chamber 58 is spherical or cylindrical. Inside the hyperbaric mixing chamber 58 the compression reaction takes place. The pressurized hydrogen gas 18 jetted into hyperbaric mixing chamber 58 causes the pressure inside hyperbaric mixing chamber 58 to increase, thereby dissolving the hydrogen gas 18 into the liquid fuel 62. The liquid fuel is thereby "hydrogenated," or infused with hydrogen. The hydrogen gas is particularized/dissolved and attaches to individual carbon molecules creating bonds between carbon and hydrogen molecules within the liquid fuel base. Depending on the pressure under which hydrogen gas is compressed and jetted into hyperbaric mixing chamber 58, a higher or lower level of hydrogen saturation within the liquid fuel is achieved.

The proximity control 54 vents the ambient pressure of hydrogen from the hyperbaric mixing chamber 58 when it determines that the desired internal pressure of the hyperbaric mixing chamber 58 is reached, thereby relaxing the atmosphere surrounding the compressed hydrogenated liquid fuel 30 and making use of hydrogen gas that remains in hyperbaric mixing chamber 58 after the hydrogenated fuel 30 is evacuated into fuel bladder 72. The vented hydrogen gas is returned for future use, thereby preserving valuable hydrogen gas.

Hydrogenated liquid fuel 30 is evacuated to the fuel bladder 72 from the hyperbaric mixing chamber 58 through check valve 50*c*, pressure regulator 68, and proximity control 70. The proximity control 70 includes a proximity switch and serves the dual purpose of determining whether the hydrogenated fuel bladder 72 is full and keeping hydrogenated fuel bladder 72 full by drawing fuel from the hyperbaric mixing chamber 58. Pressure differentials between check valve 50*c* and the combined pressure of compressor 52 and jet 56 create a forward pressure that moves hydrogenated liquid fuel 30 forward from hyperbaric mixing chamber. Pressure regulator 68 delivers hydrogenated liquid fuel 30 into fuel bladder 72 at low pressure.

Fuel pump 74 picks up hydrogenated liquid fuel 30 from fuel bladder 72 and directs the hydrogenated liquid fuel 30 through existing fuel lines to the fuel injectors 40, where the hydrogen dissolved in the hydrogenated liquid fuel 30 escapes and participates in the combustion process in the engine to achieve complete and efficient combustion.

Bypass 36 allows fuel pump 74 to draw liquid fuel 62 directly from fuel tank 60 whenever fuel bladder 72 contains an insufficient volume of hydrogenated liquid fuel 30 to support the engine's operation.

The mixing of the hydrogen gas and liquid fuel may be performed at a range of pressures to obtain a desired amount of dissolved hydrogen in the hydrogenated fuel to minimize vehicle emissions. Limited testing has shown a preferred pressure of 60 to 120 Pounds per Square Inch Gauge (PSIG), a more preferred range of 80 to 110 PSIG, and a most preferred pressure of about 90 PSIG to minimize vehicle emissions.

INDUSTRIAL APPLICABILITY

The present invention finds industrial applicability in the field of enhanced fuel.

Scope of the Invention

While the invention herein disclosed has been described by means of specific embodiments and applications thereof, numerous modifications and variations could be made thereto by those skilled in the art without departing from the scope of the invention set forth in the claims.

We claim:

1. A fuel system, comprising:
   a hydrogen source providing hydrogen gas;
   a liquid fuel tank containing liquid fuel;
   a hyperbaric mixing chamber in fluid communication with the hydrogen source to receive the hydrogen gas and in fluid communication with the liquid fuel source to receive the liquid fuel, the mixing chamber configured to dissolve the hydrogen gas in the liquid fuel at above ambient pressure to generate hydrogenated fuel, all flows into and from the hyperbaric mixing chamber are through check valves; and
   fuel injectors in fluid communication with the hyperbaric mixing chamber to receive the hydrogenated fuel and to inject the hydrogenated fuel into an engine,
   wherein unused hydrogenated return fuel is in serial fluid communication between an injection fuel pump and a return fuel bladder through a return fuel pressure regulator, a return fuel cooler, and one of the check valves.

2. The fuel system of claim 1, wherein the liquid fuel tank and the return fuel bladder are in fluid communication with the hyperbaric mixing chamber through a third proximity control configured to allow the flow of the liquid fuel and the hydrogenated return fuel into the hyperbaric mixing chamber to maintain a sufficient amount of the liquid fuel to continue dissolving the hydrogen gas in the liquid fuel, and to prevent a back flow from the hyperbaric mixing chamber.

3. The fuel system of claim 1, wherein the pressure in the hyperbaric mixing chamber is between 60 and 120 PSIG.

4. The fuel system of claim 3, wherein the pressure in the hyperbaric mixing chamber is between 80 and 110 PSIG.

5. The fuel system of claim 4, wherein the pressure in the hyperbaric mixing chamber is about 90 PSIG.

6. A fuel system, comprising:
   a hydrogen source providing hydrogen gas;
   a liquid fuel tank containing liquid fuel;
   a hyperbaric mixing chamber in fluid communication with the hydrogen source to receive the hydrogen gas and in fluid communication with the liquid fuel source to receive the liquid fuel, the mixing chamber configured to dissolve the hydrogen gas in the liquid fuel at above ambient pressure to generate hydrogenated fuel, all flows into and from the hyperbaric mixing chamber are through check valves;
   and
   fuel injectors in fluid communication with the hyperbaric mixing chamber to receive the hydrogenated fuel and to inject the hydrogenated fuel into an engine,
   wherein:
   liquid hydrogenated fuel in the hyperbaric mixing chamber is in fluid communication with a hydrogenated fuel bladder having only a single outlet, the communication through one of the check valves and a pressure regulator; and
   the hydrogenated fuel bladder is in fluid communication with the fuel injectors through a fuel injection pump.

7. A fuel system, comprising:
   a hydrogen source providing hydrogen gas;
   a liquid fuel tank containing liquid fuel;
   a hyperbaric mixing chamber in fluid communication with the hydrogen source to receive the hydrogen gas and in fluid communication with the liquid fuel source to receive the liquid fuel, the mixing chamber configured to dissolve the hydrogen gas in the liquid fuel at above ambient pressure to generate hydrogenated fuel, all flows into and from the hyperbaric mixing chamber are through check valves;
   and
   fuel injectors in fluid communication with the hyperbaric mixing chamber to receive the hydrogenated fuel and to inject the hydrogenated fuel into an engine,
   wherein the hydrogen source is in fluid communication with the hyperbaric mixing chamber through a high pressure compressor providing a pressure between 60 and 120 Pounds per Square Inch Gauge (PSIG) in the hyperbaric mixing chamber.

8. The fuel system of claim 7, wherein check valves control all of the flows into and from the hyperbaric mixing chamber to maintain pressure in the hyperbaric mixing chamber.

9. A fuel system, comprising:
   a hydrogen source providing hydrogen gas;
   a liquid fuel tank containing liquid fuel;
   a hyperbaric mixing chamber in fluid communication with the hydrogen source to receive the hydrogen gas and in fluid communication with the liquid fuel source to receive the liquid fuel, the mixing chamber configured to dissolve the hydrogen gas in the liquid fuel at above ambient pressure to generate hydrogenated fuel, all flows into and from the hyperbaric mixing chamber are through check valves;
   and
   fuel injectors in fluid communication with the hyperbaric mixing chamber to receive the hydrogenated fuel and to inject the hydrogenated fuel into an engine,
   wherein the hydrogen source is in fluid communication with a high pressure compressor through a cooler and one of the check valves.

10. The fuel system of claim 9, wherein the hydrogen gas is introduced into the hyperbaric mixing chamber through a jet.

11. A fuel system, comprising:
    a hydrogen source providing hydrogen gas;
    a liquid fuel tank containing liquid fuel;
    a hyperbaric mixing chamber in fluid communication with the hydrogen source to receive the hydrogen gas and in fluid communication with the liquid fuel source to receive the liquid fuel, the mixing chamber configured to dissolve the hydrogen gas in the liquid fuel at above ambient pressure to generate hydrogenated fuel, all flows into and from the hyperbaric mixing chamber are through check valves;
and
fuel injectors in fluid communication with the hyperbaric mixing chamber to receive the hydrogenated fuel and to inject the hydrogenated fuel into an engine,
further including a first proximity control between the hydrogen source and the hyperbaric mixing chamber configured to allow the flow of the hydrogen gas into the hyperbaric mixing chamber when the hyperbaric mixing chamber is full of the liquid fuel.

12. A method for operating an internal combustion engine on hydrogenated liquid fuel, the method comprising:
providing hydrogen gas;
providing liquid fuel;
mixing the hydrogen gas and the liquid fuel in a hyperbaric mixing chamber at high pressure to create hydrogenated fuel;
pumping the hydrogenated fuel by a fuel injection pump to fuel injectors of an internal combustion engine;
recirculating unused hydrogenated fuel to the hyperbaric mixing chamber; and,
maintaining pressure in the hyperbaric mixing chamber between 60 and 120 Pounds per Square Inch Gauge (PSIG).

13. The method of claim 12, wherein:
the hydrogen gas is provided to the hyperbaric mixing chamber through a first check valve, and a compressor;
the liquid fuel is provided to the hyperbaric mixing chamber through a fuel pump, and a second check valve;
the hydrogenated fuel is provided from the hyperbaric mixing chamber to a hydrogenated fuel bladder through a third check valve and a first pressure regulator;
the hydrogenated fuel is provided from the hydrogenated fuel bladder to the fuel injectors through the fuel injection pump; and
the unused hydrogenated fuel is recirculated to the hyperbaric mixing chamber through a second pressure regulator and a fourth check valve.

14. The method of claim 13, wherein the hydrogen gas is passed through a first cooler before entering the hyperbaric chamber.

15. The method of claim 13, wherein the unused hydrogenated fuel is passed through a second cooler before returning to the hyperbaric chamber.

16. The method of claim 12, further including recirculating the hydrogenated fuel to the hyperbaric mixing chamber through a pressure regulator and second cooler.

17. The method of claim 12, wherein the pressure is maintained in the hyperbaric mixing chamber by check valves in all of the liquid and gas paths to and from the mixing chamber.

* * * * *